United States Patent [19]

Christiansen et al.

[11] Patent Number: 4,738,606
[45] Date of Patent: Apr. 19, 1988

[54] MOLD ASSEMBLY FOR FORMING A SEAL UNIT

[75] Inventors: Keith W. Christiansen, Fox River Grove; James L. Kellner, Algonquin, both of Ill.

[73] Assignee: Chicago Rawhide Manufacturing Co., Elgin, Ill.

[21] Appl. No.: 934,427

[22] Filed: Nov. 24, 1986

[51] Int. Cl.$^4$ .............................................. B29C 65/64
[52] U.S. Cl. ................................... 425/127; 29/527.1; 264/266; 425/DIG. 47; 425/129.1
[58] Field of Search ............... 425/127, 129 R, 111, 425/117, 125, 330, 394, 395, 398, 408, 450.1, 809, DIG. 47, DIG. 228; 264/261, 263, 266, 275, 276, 271.1, 279; 249/146; 277/1, 152, 154; 29/527.1

[56] References Cited

U.S. PATENT DOCUMENTS

| | | | |
|---|---|---|---|
| 3,246,369 | 4/1966 | Rhoads et al. | 425/DIG. 47 |
| 3,773,454 | 11/1973 | Horve et al. | 425/DIG. 47 |
| 3,841,809 | 10/1974 | Tucker | 425/DIG. 47 |
| 3,950,119 | 4/1976 | Reichenbach | 425/129 R |
| 3,993,420 | 11/1976 | Haas et al. | 425/127 |
| 4,249,874 | 2/1981 | Reichenbach et al. | 425/127 |
| 4,464,322 | 8/1984 | Butler | 29/527.1 X |
| 4,542,573 | 9/1985 | Bainard | 277/1 X |
| 4,555,376 | 11/1985 | Butler | 264/266 |
| 4,580,962 | 4/1986 | Haas | 425/111 |
| 4,689,190 | 8/1987 | Peisker et al. | 425/127 |

Primary Examiner—Richard L. Chiesa
Attorney, Agent, or Firm—Lockwood, Alex, FitzGibbon & Cummings

[57] ABSTRACT

A mold assembly for making fluid seals. The mold includes an outside diameter surface on a fixed part and a seal flange support surface on another portion of the fixed part. A seal casing with a shouldered mounting flange having major and minor outside diameters and a radial flange is positioned in the fixed mold part. A movable mold member includes an upper, outer cylindrical surface for engaging the inside surface of the casing major diameter to form a flash barrier which moves during mold closure. Both the fixed mold part and the movable mold part include inwardly directed surfaces defining the mold cavity; the flange support is apertured for the elastomer to flow from the seal body-forming part of the cavity to the heel gasket-forming part of the cavity. The heel-forming cavity part lies between the lower part of the inside surface of the mold and the outer surface of the casing minor diameter.

6 Claims, 2 Drawing Sheets

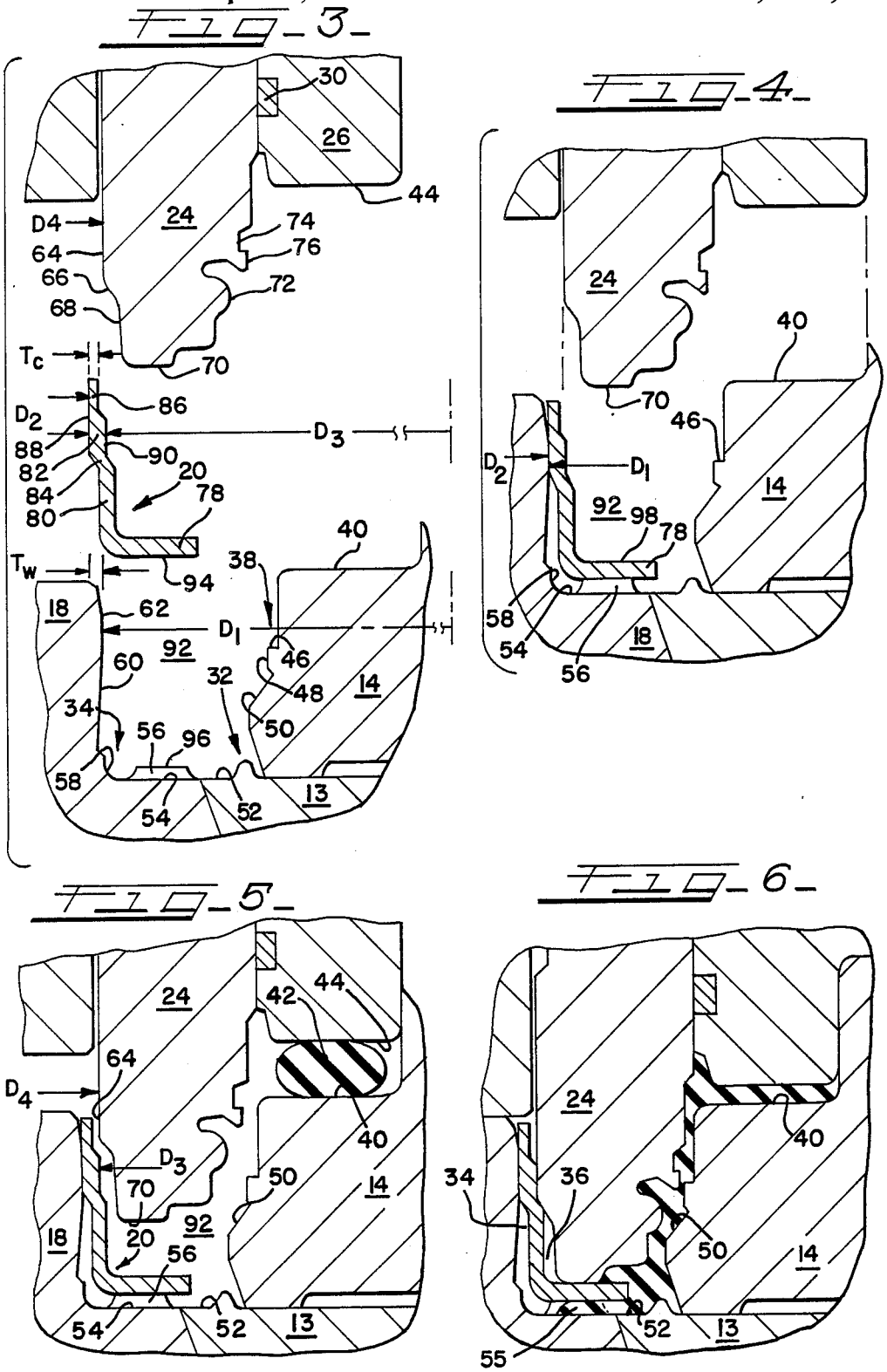

MOLD ASSEMBLY FOR FORMING A SEAL UNIT

BACKGROUND OF THE INVENTION

The present invention relates generally to oil seals, molds and methods for making such seals, and more particularly, to molds and methods for making oil seals which are especially adapted to provide improved so-called secondary sealing performance in combination with positive centering, ease of installation and reduced cost without compromise of performance in use. These objectives are achieved by providing a mold and method for making seals of the above type.

With the passage of time, and with the advent of increasingly complex drive units, particularly automotive engines and drive trains, the need for improved seals has continued. Many, if not all, modern automotive and related engines are now being called upon to perform in environments which are much more destructive of seals and other rubber accessories than has heretofore been the case.

Requirements of decreased pollution potential, for example, cause automotive engines to be operated at much higher temperatures than was previously the case. In addition, automotive oil seals are frequently called upon to resist lubricants having additives and other ingredients which are detrimental to the life and/or performance of many elastomers.

Consequently, improved machine designs have made concomitant demands for improvement in oil and other fluid seals. As a consequence of this demand, many oil seals have been proposed or tested which incorporate improved materials, principally so-called fluoroelastomers. These materials are attempts to combine the desirable physical and engineering properties of known elastomers such as resiliency, resistance to compression set, elongation and proper hardness, with properties usually more characteristic of non-elastomers, such as resistance to chemicals, high temperatures, and oxidation or other deterioration.

Many such compounds were not available until recently, and it was and is considered difficult to formulate an elastomer which has excellent chemical and high temperature resistance combined with low temperature flexibility, for example. More recently, certain high performance fluoroelastomers have been developed, but these elastomers, while very satisfactory from many aspects of performance, are extremely expensive in use. Accordingly, while the cost of the elastomer component per se has not previously been a very significant part of the cost of most oil seals, elastomer prices ranging from $5 to $10, and in some cases, up to $100 per pound, have created the need for closer control costs to achieve significant economy in the use of such expensive materials. The present invention provides seals which use minimal amounts of expensive materials.

Referring now to another aspect of modern oil seals, there has been in the past a trend toward and away from so-called rubber outside diameter seals, that is, seals wherein the secondary seal between the seal-receiving counterbore and the seal itself is achieved by contact between rubber on the outside of the seal casing and the metal of the machine counterbore. The requirements for performance in use have caused users to alternate between specifying rubber and metal outside diameters. The advantage of rubber is sometimes that of increased reliability of insertion and occasionally better secondary sealing. However, there are other advantages to metal outside diameters which possess actual or potential advantages. These include the ability to locate the inside diameter of the seal per se more accurately, because this part is often formed with respect to a metal casing outside diameter. Forming a rubber outside diameter ("OD") can cause difficulties in insuring that the diameters of both the rubber outermost diameter and those of the casing are properly centered with respect to that of the seal lip body.

A disadvantage of a rubber OD seal is that, when making an installation, the cylindrical rubber element which forms the outside diameter is placed in shear. Hence, after the seal is installed to a nominal depth in its associated counterbore, the forces urging it into position are released and the seal tends to "pop back" to a position lying axially outwardly of the specified position. This can sometimes cause axial misalignment and improper or indefinite positioning of the seal.

Consequently, there are certain applications wherein it is highly desirable to provide a seal having the best features of both a metal outside diameter, namely, positive seating, and particularly a flash-free metal OD, and those having the advantages of a rubber outside diameter, which include improved secondary sealing and ease of installation.

With seals wherein it has been attempted to make a combination rubber and metal OD, that is, where there is a heel gasket of rubber having the same OD as the metal portion, prior molding methods have been such that rubber flash or scrap has been formed on the metal OD. This may compromise the ability of the metal OD to engage the metal of the counterbore in a proper way. Hence, it has been common to posttreat these seals by scraping or wire brushing the flash or scrap from the metal OD. This is a disadvantage insofar as it requires an extra operation and insofar as the metal OD may be damaged by removal of a surface coating therefrom or otherwise during this operation.

According to the present invention, a design is provided which combines the advantages of having rubber and metal on the seal outside diameter, together with the most economical use of materials including the expensive rubber materials required to form such seal OD. Further, molds and molding methods are provided to manufacture such seals reliably at low cost.

In view of the failure of the prior art to provide a seal combining certain of the above features is an economical design, it is an object of the present invention to provide an improved oil seal.

Another object of the invention is provide an improved mold which is suitable for making oil seals according to the invention.

Still further, it is an object of the invention to provide an oil seal which includes a rigid casing having one part of its outside diameter adapted to engage and position the seal with respect to an associated counterbore, and another, reduced or minor diameter portion which serves as a bonding surface for a cylindrical rubber outside diameter secondary sealing element.

Another object of the invention is to provide a seal having a casing having two outer diameter portions, which includes a fluoroelastomer coating on the exterior of the smaller of the two diameters and wherein the larger diameter is substantially free from elastomer.

Yet another object of the invention is to provide a seal wherein the rubber outside diameter is formed by flowing rubber, during molding, from the elastomeric seal lip area to the outside diameter only along one surface of the casing, using the casing as an element of the mold cavity, and making it possible to make both the seal lip body and the outside diameter heel gasket from the same charge of material.

A further object of the invention is to provide an oil seal having fluoroelastomer principal sealing lip body as well as a fluoroelastomer heel gasket and which uses minimal amounts of material to provide these elements, in the interest of achieving maximum economy.

A still further object of the invention is to provide a mold for seal making, which mold includes first and second, relatively movable elements, one of which includes a plurality of casing support units, which serve to position the casing within the molding cavity and also assist in defining plural passage between the portion of the mold cavity defining the seal lip body and the portion defining the heel gasket so that the two elastomeric elements of the seal may be made in a single operation from a single charge of elastomer.

Another object of the invention is to provide a seal mold wherein opposed cooperating surfaces on two relatively movable mold elements are constructed and arranged so that, when a seal casing of suitable dimensions and wall thickness is positioned in the mold, the flash barriers will be established to aid in defining fluid-tight cavities for the formation of the heel gasket and portion of the sealing lip respectively.

Yet another object of the invention is to provide a mold having relatively fixed and movable parts, one of which includes a coining ring or like annular surface on one portion thereof and a flash barrier forming surface on another part thereof, such movable part being adapted to engage a sealing casing and seat it in a desired position within the mold while at the same time positioning it relative to a counterpart surface on the other, fixed portion of the mold, whereby flash barriers are established on opposed surfaces of the same casing element.

Another object is to provide a mold as described above wherein the flash barrier surfaces are formed on opposite sides of a major diameter portion of a stepped seal casing.

A still further object of the invention is to provide a mold having opposed flash barriers and means for positioning a casing within a part of the cavity, which mold parts are adapted to cooperate with a third, independent relatively movable member which is adapted upon mold closing to transfer fluent curable elastomer from a region outside the molding cavities to the molding lip and heel gasket forming areas of the cavity interior.

A further object of the invention is to provide a mold and method wherein the seal casing may have a radial flange of a given thickness and a mounting flange of a reduced wall thickness, and wherein the mounting flange wall is drawn or ironed to achieve more accurate control of such wall thickness for the purpose of eliminating flash and for facilitating mold closure and removal of the finished part.

A still further object of the invention is to provide a method of making an oil seal which includes forming a casing having walls which include major and minor outside diameter flanges, positioning such casing in a mold dimensioned so that the outer surface of the major diameter casing wall is engaged by a flash barrier on a fixed part of the mold and, prior to filling the mold cavity, engaging in an inner surface of the major diameter casing wall with a flash barrier forming surface on a movable mold member, moving the movable mold member so as to engage and seat the casing with respect to the casing support elements on the fixed mold part, thus subdividing the molding cavity into a seal body forming portion and a heel gasket forming portion, with such cavity portions being connected to each other by way of spaced apart passages defined in part by the casing support elements, and filling both the mold cavity portions with fluent curable elastomer and curing said elastomer to form a seal body and a heel gasket bonded to said casing.

The invention is carried into practice by providing a mold having at least two relatively movable parts and having surfaces which, in combination with a seal casing, define the shape of one mold cavity having a portion in the form of a seal lip body and another portion having the shape of a heel gasket, with the two cavities being in communication with each other through plural passages, and with the movable mold parts including spaced apart flash barrier surfaces adapted to engage opposed surfaces on the interior and exterior walls, respectively, of the seal casing's major diameter.

The manner in which the foregoing and other objects and advantages of the invention are achieved in practice will become more clearly apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 3 is a fragmentary vertical sectional view of the mold assembly of FIGS. 1 and 2 taken on a further enlarged scale and showing the mold parts and the seal casing in an exploded relation and the manner in which the dimensions of the seal casing and the various mold parts needed to establish cavity flash barriers are taken;

FIG. 4 is a view similar to that of FIG. 3 and showing the seal casing in place with the mold assembly still open;

FIG. 5 is a view similar to that of FIGS. 3 and 4 and showing certain movable mold parts in the process of closing;

FIG. 6 is a view similar to that of FIGS. 3, 4, and 5, and showing the mold cavity-defining parts in the fully closed position with the flash barriers confining the elastomer to the cavity section, and the molding cavity nearly, but not completely filled.

DESCRIPTION OF THE PREFERRED EMBODIMENTS OF THE INVENTION

While the principles of the invention may be embodied in mold constructions which differ in detail and may be used to make seals which differ somewhat as among themselves, a detailed description of one form of invention will be given wherein the product is an oil seal having a rubber outside diameter heel-gasket portion, as well as an elastomeric seal lip portion, wherein the molding cavity begins to be filled as flash barriers are established and wherein the mold filling is completed thereafter with the casing being held in position so as to subdivide the mold cavity into a heel-gasket forming portion and a seal-lip forming portion.

Figure 1:
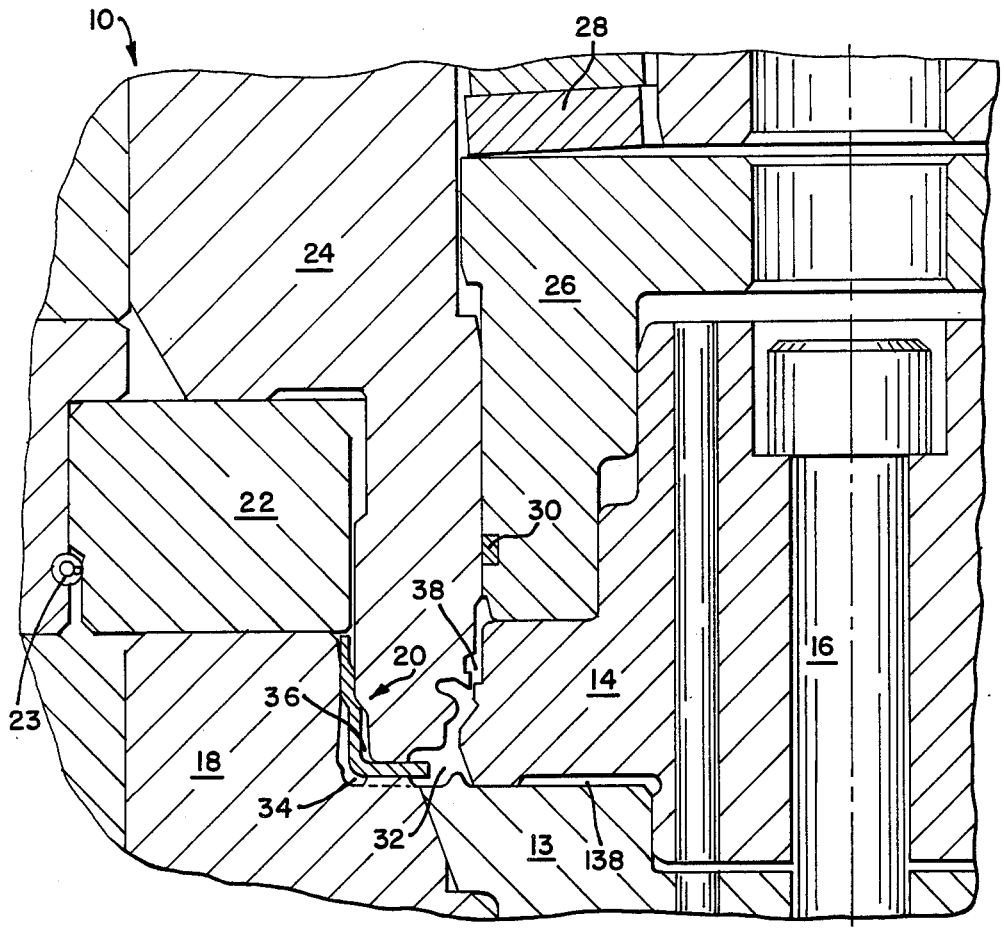
FIG. 1 is a vertical sectional view of the mold assembly of the invention in the closed position, showing a seal casing in place within the mold and showing the molding cavity empty.
Figure 7:
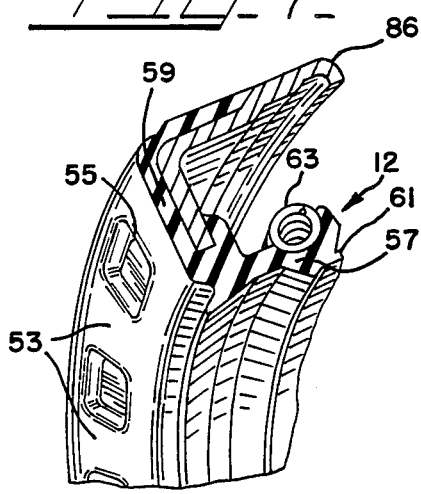
FIG. 7 is a fragmentary perspective view of a finished seal made in the molds shown in FIGS. 1-6.

Referring now to the drawings in greater detail, FIG. 1 shows the invention to be embodied in a seal-making mold generally designated 10 and shown to be used in producing a fluid seal of the type generally designated 12 in FIG. 7. As is further shown in FIG. 1, the mold assembly 10 comprises a plurality of individual elements, including a lower mold core generally designated 13, and shown to be received and positioned with respect to an inner core generally designated 14 by hold-down fastener means in the form of a cap screw 16 secured to a lower mold plate (not shown) in a conventional manner.

Located just radially outside the lower core 13 and disposed in snug, fluid-tight concentric relation therewith is a bottom insert 18 which is adapted to receive and position a seal casing generally designated 20 in a manner to be described in detail herein.

The mold assembly 10 further includes a plurality of relatively movable parts including a holddown ring 22, held in place by a garter spring 23, a top insert 24, and a plunger 26 operated by a stack of Belleville springs 28. A fluorocarbon or like sealing ring 30 keeps the elastomer from flowing into the working clearance between the plunger 26 and the top insert 24. For further details of these parts of the mold construction, reference is made to U.S. Pat. No. 3,950,119, issued Apr. 13, 1976.

FIG. 1 also shows that a cavity 32 for forming a primary seal lip body and a heel gasket forming cavity 34 are created when these mold parts are in the closed position with the casing 20 in the mold. Moreover, an auxiliary cavity 36 and a tear trim pocket 38 are also shown to be formed in this embodiment when these mold parts are in the closed position. Plural vacuum passages 138 exist between various mold parts throughout the assembly 10 also, but since such passages 138 are of a type known to those skilled in the art and form no part of the invention which is novel per se, a further description of them will be omitted.

Referring now to FIGS. 3-5, additional details of the foregoing elements are shown, including the relation of the casing 20 to the remainder of the mold elements 13, 14, 18, 24. FIG. 3 shows that the inner core 14 includes radially extending annular shelf 40 for receiving an annular "prep" or prepared portion of rubber in the general form of an uncurved torus or donut 42. The plunger 26 has a downwardly directed, radially extending annular end face surface 44 which engages the prep 42 held on the shelf 40, and as the mold is closed, the diminishing volume between these parts forces the curable elastomer first through the tear trim pocket 38 and then into the cavities 32, 34, 36.

The inner core 14 further includes a shoulder 46 and a cylindrical surface 48 of increased diameter which define respectively certain parts of the tear trim pocket 38 and the passage extending therefrom to the seal body forming cavity 32. The core 14 also includes contoured annular surfaces 50 which define parts of the primary and auxiliary seal lips in the finished product. The lower core 13 includes contoured surfaces 52 which define portions of the auxiliary seal lip, while the outer core 18 includes a radial end face surface 64 on which a plurality of circumferentially spaced apart casing support elements 56 are received. The outer core 18 also includes contoured surfaces 58 defining the nose portion of the heel gasket, a reversely tapered surface 60 defining parts of the heel gasket OD surface, and a precisely dimensioned cylindrical outer flash barrier forming surface 62.

Figure 2:
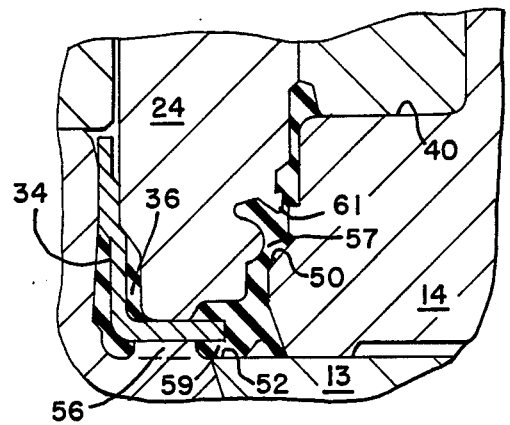
FIG. 2 is a fragmentary enlarged vertical sectional view of a portion of the mold assembly of FIG. 1 showing the cavity filled with a curable elastomer.

By comparing FIGS. 2 and 3, for example, it will be noted that the casing support elements 56 are evenly spaced apart around the circumference of the surface 54 with the result that a plurality of passages 55 extend between cavities 32 and 34 to provide plural flow paths for the rubber as its flows from cavity 32 into cavity 34 when the mold is closing (FIG. 6). In the finished product, (FIG. 7) the rubber in the passages chaplets 55 appears as a series of radially extending ribs or chaplets 55 extending between the seal body 57 and the heel gasket 59. The finished seal also includes a garter spring 63 and shows that a curl has been formed in the reduced thickness extension 86 of the casing 20.

The top insert 24 includes a counterpart cylindrical surface 64 which is the inner surface counterpart of surface 60 and which is adapted to form a flash barrier with the inner casing sidewall surface in a manner to be detailed herein. The lower portion of the top insert 24 also includes a shoulder 66, an auxiliary cavity defining surface 68, a coining ring or land end face surface 70, plural contoured annular, generally radially inwardly directed surfaces 72 defining parts of the seal body forming 32 cavity and a circumferential groove 74 defining part of the tear trim pocket 38. The surface 76 forms part of the passage extending between the tear trim pocket 38 and the cavity 32 when the mold parts are in the closed position. This passage is of thin cross-section and forms the tearable membrane of which only a vestige (61 in FIG. 7) remains in the final product. The groove 74 retains the remaining parts of the cured rubber to assist in the tearing action.

Referring now in particular to FIGS. 3-5, it is shown that the casing 20 includes a radial flange 78 and an axial flange comprised of minor and major diameter casing sidewalls 80, 82, a neck 84 intermediate these sidewalls 80, 82 and a curl forming casing extension 86. In the drawings, various dimensions are schematically illustrated, and some of these are important to the invention. These dimensions include $D_1$, the diameter of the flash barrier surface 62 on the outer core, and $D_2$, the diameter of the OD surface 88 of the major diameter casing wall 82. $D_3$ is the ID of the major diameter casing wall, and $D_4$ is the diameter of the top insert flash barrier surface 64. The thickness of the reduced diameter curl-forming extension 86 is shown as $T_c$ in FIG. 3, while FIG. 3 also shows the actual wall thickness $T_w$, that is, the difference in the diameters of the inner and outer surfaces of the major diameter casing mold 82.

Referring now to the operation of the molding method of the invention, the dimensional characteristics of the casing must be carefully related to this kind of mold in order for the method to be practiced successfully. Accordingly, for example, a casing 20 is selected which has a wall thickness of 0.045" in the radial flange section 78. This casing, which also includes a axially extending or mounting flange wall 80 is then drawn or ironed, or both, in a press so as to impart to it a precise size. In the so-called ironing process, there is relative movement between inner and outer forming dies in a manner known to those skilled in the art. This process, as practiced for purposes of the present invention, reduces the wall thickness $T_w$ of the axial flange in the areas 80, 82 and 84 to a carefully controlled wall thickness of 0.036", plus or minus 0.005. Thereupon, the casing 20 is positioned for insertion into the mold assembly 10 wherein dimensions $D_1$ and $D_2$ insure a line to line contact between the OD surface 88 of the major diameter casing wall 82 and the flash barrier surface 62 on the bottom insert 18. Similarly, the diameter of the top insert flash barrier surface 64 is related to the diameter 90 of the diameter $D_3$ of the inner surface 90 of the major diameter casing wall 82 such that there is an interference of 0 to 0.001 inches.

With these dimensions being established, and with a "prep" of rubber 42 being positioned as shown on the shelf 40, the mold is closed. The casing 20 may fall freely or may be carried by the end face surface 70 of the top insert 24 into the area generally designated 92 in FIGS. 3 and 4, that is, the area between the two relatively movable mold parts.

As the mold closes, and the lower end face surface 44 of the plunger 24 engages the prep 42, the flash barrier surface 64 of the top insert 24 approaches the ID surface 90 of the major diameter casing wall 82, where the casing 20 is then carried to a fully seated position with the lower surface 94 of the casing flange 78 engaging the upper surface 96 of the casing support 56. At this point, as shown in FIG. 6, for example, there is engagement between the two mutually opposed flash barrier surfaces 62, 64 on the opposed mold parts 18, 24 with the OD and ID surfaces 88, 90 of the major diameter casing wall 82 being wedged therebetween in fluid-tight relation. Likewise, the land or coining ring surface 70 of the top insert 24 has engaged the upper surface 98 of the casing flange 78 in fluid-tight relation.

As shown in FIG. 6, there is metal-to-metal contact between the land 70, the casing flange 78, and the casing support surface 56 of the mold part 18, as well as the establishment of flash barriers on mold surfaces 62, 64 prior to the time the lower surface 44 of the plunger has transferred the entire prep through the tear trim pocket 38 and into the cavities 32, 34.

Just after this point, the plunger becomes fully seated and both cavities 32, 34 are completely filled. In some cases, the auxiliary cavity 36 may also be at least partially filled. Whether this cavity 36 is filled depends on the mold "timing"; i.e., the relative position of the rubber in filling the cavity compared to the engagement between the coining land 70 and the casing surface 98. In other words, if the top insert 24 achieves its final position well before the plunger 26 has moved substantially, the cavity 36 will be empty. If the plunger 26 has forced most of the prep into the cavity areas before the land 70 is fully seated, the cavity 36 will be partially or completely filled. If the plunger 26 is not used, and a two-piece compression mold is used, it is anticipated that the cavity 36 will be filled in all cases. FIG. 2 shows the mold fully closed and filled and the casing in place. After this condition is achieved, the elastomer is permitted to cure and the mold is opened.

When this happens, the tear trim pocket 38 acts to retain parts of the rubber and case separation of the prep remnants from the seal body, thereby tearing the membrane 61.

According to the invention, the forming of the reduced thickness casing walls is not strictly necessary to the practice of the invention but the practice is facilitated by the use of this or other suitable methods for insuring dimensional accuracy in the casing. The recited method of ironing the casing wall is known to those skilled in the art and does not form a part of the invention which is novel per se. Other methods achieving equivalent results are also satisfactory for this purpose. According to the invention, there may be significant relative movement between the top insert and the ID 90 of the major diameter casing wall so that the flash barrier is established and maintained throughout a significant distance of mold closure travel. This affords an opportunity for maintaining a flash free condition on both the ID and OD surfaces of the selected casing wall. While dimensions recited are applicable to those making seals of perhaps 1½ to three inches in diameter, merely by way of example, smaller or larger seals may be made using the same degree of interference or, perhaps, slightly more or less as may be indicated by the materials used and other factors. If too much residual interference is provided, the parts will be difficult to remove from the mold or may be slightly deformed during manufacture whereas if the interference is too little, there may be some flash formed, particularly where the parts are at the limit of or slightly out of intended tolerances.

According to the invention, if the radial dimensions of the casing are not exact but the wall thicknesses are correct, a certain amount of stretching or reforming of the casing may be achieved during mold closure and this may be accomplished within the scope of the invention. It has been determined that it is preferred to have the overall diameter of the casing be slightly smaller than the flash barrier surface on the lower insert rather than larger if possible, but the invention may also be operative in some cases where the casing is effectively reduced by some small amount during the molding operation. Seals made according to the invention have been characterised by freedom from flash on the OD of the casing major diameter and close control of actual size. These seals are easy to insert and yet lock firmly in place in the counterbore when installed according to specifications. The rubber heel gasket provides excellent sealing and takes advantage of the characteristics of the elastomers used for the application, namely, high temperature and/or chemical resistance and the like. The method of the operation has proved economical in use and capable of consistently providing high quality parts. It will thus be seen that the present invention provides a novel seal, seal mold and method having a number of advantages and characteristics, including those pointed out specifically herein and others which are inherent in the invention. A description of the one embodiment of the example having been set forth in detail, it will occur to those skilled in the art that variations and modifications to the described form of method and apparatus may be made without departing from the spirit of the invention or the scope of the appended claims.

What is claimed is:

1. A mold assembly for forming a seal unit having an elastomeric seal body and a heel gasket made from a charge of fluent, curable elastomeric molding material and bonded to a seal casing having generally axially extending major and minor diameter cylindrical sidewalls joined to each other by an offsetting shoulder and a seal body bonding flange joined to and extending radially inwardly from an end portion of said minor diameter casing flange, said mold assembly comprising, in combination, at least one relatively fixed mold part including a generally cylindrical surface having a flash barrier surface lying on a radially inwardly directed, axially extending portion thereof, said mold part further including additional surfaces defining portions of the interior of a molding cavity, and means for engaging one surface of said bonding flange portion of said seal casing so as to support said casing so that portions thereof lie within the interior of said molding cavity, said mold assembly further including at least one relatively movable mold part having surfaces thereon defining additional portions of said molding cavity, said supporting means for said bonding flange cooperating with portions of said casing to provide plural, spaced apart passages extending between first and second portions of said molding cavity, said first portion being a seal body forming a portion and said second portion being a heel gasket forming portion, said movable mold part also including a land for engaging the surface of said bonding flange lying opposite the surface thereof engaged by said bonding flange support means on said fixed mold part, said movable mold part further including a shoulder spaced axially from said land and a casing-engaging flash barrier surface lying adjacent said shoulder, said flash barrier surface on said movable mold part, in the closed position of said mold assembly, lying radially opposite said flash barrier surface on said fixed mold part, said flash barrier surfaces being adapted to engage in fluid-tight relation opposed inner and outer surfaces defining portions of said major diameter sidewall when a seal casing of suitably dimensioned diameter and wall thickness is disposed in said mold and said mold parts are moved to the closed position thereof, said passages also permitting said charge of molding material to be forced from said first portion of said molding cavity into said second portion of said cavity upon mold closure, and whereby said gasket and seal body may be formed from said single charge of fluent, curable elastomer in a single molding step.

2. A mold assembly as defined in claim 1 wherein each of said fixed and movable mold parts further includes surfaces which cooperate to define therebetween, in the closed position of said mold, an annular tear trim pocket having a main area of a given cross-section and an exit area of reduced cross-section forming a passage extending from the exterior to the interior of said seal body molding cavity.

3. A mold assembly as defined in claim 1 which further includes a plunger element which is movable relative to said fixed and movable mold parts, said fixed mold part further including means for receiving said charge of molding material, said charge-receiving means and said plunger being arranged in axial alignment, with said plunger being biasable to a position overlying said charge-receiving means by stiff but resilient spring means.

4. A mold assembly as defined in claim 1 wherein said assembly further includes a holddown ring having a downwardly directed surface adapted to engage an end face surface of said major diameter sidewall of said casing, said holddown ring and said relatively movable mold part being spaced apart from each other by a working clearance.

5. A mold assembly as defined in claim 1 wherein said surfaces on said relatively movable mold part defining portions of said seal body forming cavity include surfaces defining a spring-receiving groove.

6. A mold assembly as defined in claim 1 wherein the portion of said relatively movable mold part lying between said shoulder and said land engageable with said radial casing flange cooperate with at leat one inwardly directed surface of said minor diameter sidewall and said radial flange to define an auxiliary cavity.

* * * * *